United States Patent Office 3,850,933
Patented Nov. 26, 1974

3,850,933
2,3,6,7-TETRAHYDRO - 2,2 - DIMETHYL-5,7-DIOXO-8 - HYDRONITROGENO - 5H - THIAZOLO[3,2-c]PYRIMIDINE - 3 - CARBOXYLIC ACIDS, ESTERS AND ALKALI METAL SALTS AND THE PREPARATION THEREOF
Abraham Nudelman, Bala Cynwyd, and Ronald J. McCaully, Malvern, Pa., assignors to American Home Products Corporation, New York, N.Y.
No Drawing. Filed Mar. 28, 1973, Ser. No. 345,803
Int. Cl. C07d 99/10
U.S. Cl. 260—256.5 R          14 Claims

ABSTRACT OF THE DISCLOSURE

Novel thiazolo[2,3-c]pyrimidine - 3 - carboxylic acid esters possessing antitrichomonal activity are prepared by reacting a 6-amino-1-oxopenicillanic acid ester of the formula

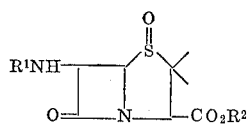

in which
$R^1$ is a carboxylic acid acyl moiety and
$R^2$ is an alcohol moiety with a lower alkyl carbonic isocyanic anhydride of the formula

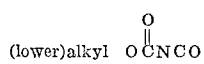

followed by selective conversion of the 8-acyl group by solvolysis to obtain a free amino substituent; or the 3-carboxylic acid ester group by hydrogenolysis or hydrolysis to obtain the free acid.

BRIEF DESCRIPTION OF THE INVENTION

In accordance with this invention there is provided a group of chemical compounds possessing antitrichomonal activity which are generically described as 2,3,6,7-tetrahydro - 2,2 - dimethyl-5,7-dioxo-8-hydronitrogeno-5H-thiazolo[3,2-c]pyrimidine-3-carboxylic acids, esters and alkali metal salts. In addition, this invention provides a process for the production of the compounds of the invention which comprises reacting a 6-amido-1-oxopenicillanic acid ester with ethyl carbonic isocyanic anhydride. The 8-amido substituent of the resulting thiazolo[3,2-c]pyrimidine derivative may be selectively converted to a free amino group by solvolysis as for example by mild treatment with ethanolic HCl and subsequently acylated with a desired acylating agent. The free 3-carboxylic acid may be selectively formed by hydrolysis or hydrogenolysis and the resulting acid is readily converted to another desirable ester or an alkali metal salt by conventional techniques.

DETAILED DESCRIPTION OF THE INVENTION

The antitrichomonal compounds of this invention present the structural formula:

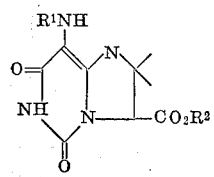

in which
$R^1$ is a member selected from the group consisting of —H, alkanoyl of 1 to 6 carbon atoms, alkoxyalkanoyl of 3 to 9 carbon atoms, arylalkanoyl of 8 to 16 carbon atoms, aryloxyalkanoyl of 8 to 16 carbon atoms and aroyl of 6 to 10 carbon atoms; and
$R^2$ is a member selected from the group consisting of —H, alkyl of 1 to 6 carbon atoms, aryl of 6 to 10 carbon atoms, aralkyl of 7 to 18 carbon atoms, nitroaralkyl of 7 to 18 carbon atoms and an alkali metal atom.

The preferred compound aspect of this invention embraces those compounds of the preceding structural formula in which $R^1$ is hydrogen, phenylacetyl or phenoxyacetyl and $R^2$ is hydrogen, p-nitrobenzyl or the p-methylbenzyl radicals.

The process by which the compounds of this invention are prepared involves the reaction of a 6-amido-1-oxopenicillanic acid ester with a (lower)alkyl carbonic isocyanic anhydride in an inert, aprotic, organic solvent at from ambient temperature to about 100° C. The 6-amido-1-oxo-penicillanic acid esters are prepared by the method of Barton et al., J. Chem. Soc. (London) (C), pp. 3540–3550 (1971) as is also indicated in Example 6, infra. The solvent may be any inert, aprotic, organic solvent capable of dissolving at least a portion of the reactants and, most desirably, having sufficient volatility to be readily removable from the product. Such solvents are illustrated by tetrahydrofuran, dioxane, dimethoxyethane, and the like. The reaction is conveniently conducted at reflux in tetrahydrofuran and may be performed below the reflux temperature of such solvents as dioxane, the reaction proceeding smoothly at ambient temperature up to about 100° C., preferably from 60 to about 100° C. for a period of about one to twenty-four hours.

After formation of the 8-amido-thiazolo[3,2-c]pyrimidine-3-carboxylic acid ester, either the 8-amido group or the 3-carboxylic acid ester group may be selectively converted to the free amino group or the free carboxylic acid group by solvolysis, and hydrogenolysis or hydrolysis, respectively.

In practice the 8-amido-thiazolo[3,2-c]pyrimidine-3-carboxylic acid ester is isolated from the reaction solvent by evaporation of the solvent followed by purification of the product by dissolution in a water immiscible organic solvent, such as methylene chloride and extraction several times with water. The organic phase is then separated, dried and evaporated to afford an oil which crystallizes. The crude reaction product may alternatively be purified by column chromatography.

The 8-amido substituent is converted to a free amino substituent by treatment with a lower alcohol and hydrochloric acid. The 8-amino group may then be acylated with a desired acylating agent, such as acetyl chloride, propionyl chloride, hexanoyl chloride, benzoyl chloride, 4-phenoxybutanoyl chloride, and the like.

The 3-carboxylic acid ester group is selectively converted to the free acid by hydrogenation in the presence of a noble metal catalyst under mild conditions. Alternatively, the ester may be hydrolyzed. Reesterification of the carboxylic acid with a desired group is conducted by conventional means.

The trichomonacidal activity of the compounds of this invention was determined in accordance with the following standard test procedure which has been found acceptable by pharmacological evaluators in establishing antitrichomonal activity.

A 12.5 milligram portion of the test compound is added to 2.5 milliliters of 1 percent phosphate buffer, pH 6. Further two-fold dilutions of the solution are made with the same buffer. A one milliliter volume of each dilution is transferred to small sterile screw cap assay tubes containing 3.8 milliliters of Diamond medium (American Type Culture Collection, Rockville, Md.) and 0.1 milliliter of calf serum. Each assay tube is inoculated with 0.1 milliliter of a 48 to 72 hour culture of *Trichomonas vaginalis* strain ATCC No. 13972. A control assay tube containing no test material is similarly inoculated. The assay tubes are gently shaken and then incubated for 48 hours at 30° C. Following incubation the tubes are gently shaken and with the aid of a Pasteur pipette a drop of the cultured material is deposited on a Spiers-Levy eosinophil counting chamber. The chamber is examined by phase contrast microscopy. The number of organisms present in one square millimeter is multiplied by 5000 in order to express the count per milliliter. The difference in the number of organisms present in the control tube and in the tubes containing the test material represents the relative potency of the test material and is expressed as the percentage kill at the specific dose level.

The compounds of this invention which were tested in accordance with the procedure detailed in the preceding paragraph generally resulted in near 100% kill at concentrations of 1000 micrograms per milliliter. The specific information for the compounds tested is presented in conjunction with the working example of the compound preparation, *infra*, as a percent kill at the recited concentration.

Thus, the compounds of this invention are useful trichomonacides finding current application in those trichomoniasis caused infections or disease conditions commonly attributable to *T. vaginalis*, *T. foetus*, *T. diversa* and *T. gallinorum* as found in vertebrate animals, such as domestic cattle and various birds.

The following examples are presented to illustrate the invention and are not to be construed as limitations on the true scope of the invention.

EXAMPLE 1

2,3,6,7-tetrahydro - 2,2 - dimethyl-5,7-dioxo-8-(2-phenoxyacetamido)-5-H - thiazolo[3,2-c]pyrimidine-3-carboxylic acid, p-nitrobenzyl ester A solution of 6-(2-phenoxyacetamido)penicillanic acid, p-nitrobenzyl ester, 1-oxide (25.5 g., 0.05 mole) and ethyl carbonic isocyanic anhydride (13.3 g., 0.11 mole) in 400 ml. of anhydrous tetrahydrofuran was refluxed for 17 hr. The solution was cooled, mixed with charcoal, filtered and flash evaporated. The residual oil was dissolved in methylene chloride and was washed several times with water. The organic phase was dried and evaporated to an oil which was crystallized from *i*-propyl alcohol, to give a total of 14.4 g. (54% yield) of the title compound, which melted with decomposition over a wide range, $[\alpha]_{546}^{24}$ −249.05° (c 1.056, acetone), NMR (DCCl$_3$), p.p.m. ($\delta$), 1.5, (s, 3), 1.60 (s, 3),

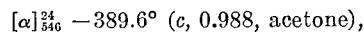

4.76 (s, 1, 3-H), 5.32 (s, 2, CO$_2$CH$_2$), 6.9–7.5 (m, 5), 7.88 (q, 4, $\delta$ 0.72 p.p.m., J$_{H-H}$ 6 cps.), 9.35 (broad s, 1, NH), 11.5 (s, 1, NH).

Elemental analysis for C$_{24}$H$_{22}$N$_4$O$_8$S·¼H$_2$O (MW 531.01).—Calcd.: C, 54.29; H, 4.27; N, 10.55. Found: C, 54.19; H, 4.26; N, 10.23.

EXAMPLE 2

2,3,6,7-tetrahydro - 2,2 - dimethyl-5,7-dioxo-8-(2-phenoxyacetamido)-5H-thiazolo[3,2-c]pyrimidine - 3 - carboxylic acid To a solution of the product of Example 1 (8.7 g., 16.5 mmoles) in 200 ml. of 3:2 ethanol:methanol was added 9 g. of 5% palladium on alumina catalyst, and the mixture was hydrogenolyzed at room temperature. Within two hours the theoretical amount of hydrogen was absorbed. The catalyst was filtered off and the filtrate was flash evaporated to an oil which was dissolved in ethyl acetate. The solution was extracted with saturated sodium bicarbonate; the aqueous phase was filtered, covered with fresh ethyl acetate and acidified to pH 1.7 with concentrated hydrochloric acid. The organic phase was separated, mixed with charcoal, dried over magnesium sulfate and evaporated to a foam which was crystallized from acetone/diethyl ether/pentane to give 4.7 g. (71% yield) of the title compound, m.p. 207–210° C., $[\alpha]_{546}^{24}$ −389.6° (c, 0.988, acetone), NMR (DMSO-D$_6$) p.p.m. ($\delta$) 1.40 (s, 3), 1.55 (s, 3), 4.62 (s, 1, 3-H),

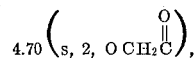

6.8–7.6 (m, 5), 11.25 (s, 1, NH), 11.5 (broad, s, 1, NH).

Elemental analysis for C$_{17}$H$_{17}$N$_3$O$_6$S·½H$_2$O: Calc'd: C, 50.99; H, 4.53; N, 10.49; S, 8.01. Found: C, 51.13; H, 4.42; N, 10.33; S, 8.26.

EXAMPLE 3

8-amino2,3,6,7-tetrahydro-2,2-dimethyl-5,7 - dioxo - 5H-thiazolo[3,2-c]pyrimidine-3-carboxylic acid p-nitrobenzyl ester A solution of the product of Example 1 (2.6 g., 5 mmoles) in 200 ml. of a methanolic hydrogen chloride was refluxed until no evidence of the amide containing reactant could be detected by thin layer chromatography (diethyl ether eluant on silica gel plates). The solvent was flash evaporated, the residue was dissolved in ethyl acetate and was washed with water. The organic phase was dried and evaporated to an oil which was crystallized from dichloromethane-diethyl ether, to give 1.2 g. (65% yield) of the title compound, m.p. 221–223° C., $[\alpha]_{546}^{24}$ −215.2° (c, 1.059, acetone), NMR (DMSO-D$_6$) p.p.m. ($\delta$) 1.50 (s, 3), 1.52 (s, 3), 4.90 (s, 1, 3-H), 5.38 (s, 2, CO$_2$CH$_2$), 6.9 (s, 2, NH$_2$), 7.92 (q, 4, $\delta$ 0.62 p.p.m., J$_{H-H}$ 6 cps.), 10.8 (s, 1, NH).

Elemental analysis for C$_{16}$H$_{16}$N$_4$O$_6$S: Calc'd: C, 48.97; H, 4.11; N, 14.28; S, 8.17. Found: C, 49.30; H, 4.39; N, liter. 99 percent kill at 1000 micrograms per milliliter.

EXAMPLE 4

2,3,6,7-tetrahydro-2,2-dimethyl-5,7-dioxo-8 - (2 - phenylacetamido)-5H-thiazolo[3,2-c]pyrimidine-3 - carboxylic acid, p-nitrobenzyl ester A solution of 6-(2-phenylacetamido)penicillanic acid, p-nitrobenzyl ester, 1-oxide (4.85 g., 0.01 mole) and ethyl carbonic isocyanic anhydride (6 ml.) in 100 ml. of anhydrous tetrahydrofuran was refluxed for 17 hours. The solvent was flash evaporated and the residue was chromatographed on 1000 g. of silica gel, by elution with 3:2 diethyl ether-pentane. A total of 1000 ml. of eluate was collected per fraction. The title compound 1.6 g. (31% yield) was obtained from the combined residues of fractions 5–12, it did not melt sharply but decomposed above 70° C., $[\alpha]_{546}^{24}$ −315.8° (c, 1.064, acetone), NMR (DMSO-D$_6$), p.p.m. ($\delta$), 1.42 (s, 3), 1.52 (s, 3),

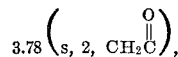

4.90 (s, 1, 3-H), 5.37 (s, 2, CO$_2$CH$_2$), 7.35 (s, 5, Ph), 7.89 (q, 4, $\delta$ 0.58 p.p.m., J$_{H-H}$ 6 cps.), 10.40 (s, 1, NH), 11.53 (s, 1, NH).

Elemental analysis for C$_{24}$H$_{22}$N$_4$O$_7$S·½H$_2$O: Calc'd: C, 55.48; H, 4.46; N, 10.78; S, 6.17. Found: C, 54.98; H, 4.91; N, 10.74; S, 6.37. 98 percent kill at 100 micrograms per milliliter. 99 percent kill at 1000 micrograms per milliliter.

EXAMPLE 5

2,3,6,7-tetrahydro-2,2-dimethyl-5,7-dioxo-8 - (2 - phenylacetamido)-5H-thiazolo[3,2-c]pyrimidine-3 - carboxylic acid The title compound was prepared by a similar procedure to that described in Example 2, by hydrogenolysis of product of Example 4 (1.02 g., 2 mmoles) on 1 g. of catalyst. The product obtained, 400 mg. (54% yield), decomposes above 205° C., $[\alpha]^{24}_{546}$ −457.06° (c, 1.048, acetone), NMR (DMSO-D$_6$), p.p.m. ($\delta$) 1.35 (s, 3), 1.51 (s, 3), 3.75 $\left(\text{s, 2, CH}_2\overset{\text{O}}{\underset{\|}{\text{C}}}\right)_2$ 4.60 (s, 1, 3-H), 5.3–6 (broad band, CO$_2$H), 7.33 (s, 5, Ph), 10.3 (s, 1, NH), 11.4 (broad s, 1, NH).

Elemental analysis for C$_{17}$H$_{17}$N$_3$O$_5$S: Calc'd: C, 54.39; H, 4.51; N, 11.19. Found: C, 54.39; H, 4.64; N, 10.98. 0 percent kill at 100 micrograms per milliliter. 41 percent kill at 1000 micrograms per milliliter.

EXAMPLE 6

2,3,6,7-tetrahydro-2,2-dimethyl-5,7-dioxo-8 - (2-phenoxyacetamido)-5H-thiazolo[3,2-c]pyrimidine-3 - carboxylic acid, p-methylbenzyl ester 6-(2-phenoxyacetamido)penicillanic acid, p-methylbenzyl ester 1-oxide was prepared by the procedure of Barton et al., J. Chem. Soc. (London) (C), pp. 3540–3550 (1971). This compound had a m.p. 105–106.5° C., $[\alpha]^{24}_{546}$ +165.74° (c, 0.9895, acetone), NMR (DCCl$_3$), p.p.m. ($\delta$) 1.04 (s, 3), 1.63 (s, 3), 2.33 (s, 3, p-Me), 4.51 $\left(\text{s, 2, OCH}_2\overset{\text{O}}{\underset{\|}{\text{C}}}\right)$, 4.70 (s, 1, 3-H), 5.02 (d, 1, 5-H), 5.25 (s, 2, CO$_2$CH$_2$), 6.1 (d, d, 1, 6-H), 6.8–7.6 (m, 9), 8.30 (d, 1, NH).

Elemental analysis for C$_{24}$H$_{26}$N$_2$O$_6$S: Calc'd: C, 61.26; H, 5.57; N, 5.95. Found: C, 61.17; H, 5.61; N, 5.82.

The procedure for the preparation of the title compound was the same as that described for the p-nitro benzyl ester in Example 4, employing the p-methylbenzyl ester of the preceding paragraph. The product was obtained in 40% yield, it does not melt but slowly decomposes about 80° C., $[\alpha]^{26}_{546}$ −315.63° (c, 1.017, acetone), NMR (DCCl$_3$) p.p.m. ($\delta$) 1.46 (s, 3), 1.51 (s, 3), 2.31 (s, 3, p-Me), 4.60 (s, 2, CO$_2$CH$_2$), 4.71 (s, 1, 3-H), 5.18 $\left(\text{s, 2, OCH}_2\overset{\text{O}}{\underset{\|}{\text{C}}}\right)$, 6.9–7.6 (m, 9), 9.70 (s, 1, NH), 11.50 (s, 1, NH).

Elemental analysis for C$_{25}$H$_{25}$N$_3$O$_6$S: Calc'd: C, 60.59; H, 5.09; N, 8.48; S, 6.47. Found: C, 60.04; H, 4.99; N, 8.28; S, 6.50.

EXAMPLE 7

8-amino-2,3,6,7-tetrahydro-2,2-dimethyl-5,7 - dioxo - 5H-thiazolo[3,2-c]pyrimidine-3-carboxylic acid p-methylbenzyl ester The title compound was obtained in 70% yield from the product of Example 6 procedure as that described in Example 3. It decomposed about 80° C., $[\alpha]^{26}_{546}$ −192.73° (c, 0.991, acetone), NMR (DCCl$_3$) p.p.m. ($\delta$) 1.5 (s, 6), 2.32 (s, 3), 4.71 (s, 1, 3-H), 5.17 (s, 2, CO$_2$CH$_2$), 5.91 (s, 2, NH$_2$), 7.20 (s, 4), 9.9 (s, 1, NH).

Elemental analysis for C$_{17}$H$_{19}$N$_3$O$_4$S: Calc'd: C, 56.16; H, 5.20; N, 11.33, S, 8.87. Found: C, 56.49; H, 5.30; N, 11.63; S, 8.90. 0 percent kill at 100 micrograms per milliliter. 91 percent kill at 1000 micrograms per milliliter.

EXAMPLE 8

8-amino-2,3,6,7-tetrahydro-2,2-dimethyl-5,7 - dioxo - 5H-thiazolo[3,2-c]pyrimidine-3-carboxylic acid A solution of the product of Example 2 (1 g., 2.55 mmoles) in 200 ml. methanolic solution of hydrogen chloride was stirred at room temperature for two hours. The solvent was flash evaporated and the residue was washed repeatedly with diethyl ether, and was then crystallized from acetone/diethyl ether/pentane, to give 350 mg. (54% yield) of solid which did not melt sharply but decomposed above 150° C., $[\alpha]^{26}_{546}$ −175.15° (c, 0.982, acetone), NMR (DMSO-D$_6$) p.p.m. ($\delta$) 1.41 (s, 3), 1.53 (s, 3), 4.53 (s, 1, 3-H), 6.7 (broad, s, 2, NH$_2$), 10.59 (s, 1, NH). The NMR spectrum also indicated the presence of a small amount of diethyl ether which proved to be extremely difficult to remove even at high temperature and under vacuum. The small amount of ether present may account for the high carbon and low nitrogen analysis.

Elemental analysis for C$_9$H$_{11}$N$_3$O$_4$S: Calc'd: C, 42.01; H, 4.31; N, 16.33. Found: C, 42.44; H, 4.35; N, 14.65.

EXAMPLE 9

8-amino-2,3,6,7-tetrahydro - 2,2-dimethyl - 5,7-dioxo-5H-thiazolo[3,2-c]pyrimidine-3-carboxylic acid A solution of the product of Example 3 (2.5 g., 6.38 mmoles) in 150 ml. of 2:1 methanol:ethanol was hydrogenolyzed in the presence of 2.5 g. of 5% palladium on alumina catalyst. Within 40 minutes the theoretical amount of hydrogen was absorbed. The catalyst was filtered and the filtrate was flash evaporated to give a gum which solidified in dichloro methane. Crystallization from acetone-diethyl ether efforded the desired product (800 mg., 49% yield) whose NMR was identical to that obtained in Example 8 but containing also a small amount of p-nitroaniline.

When the same reaction was carried out on the product of Example 7 the desired product was obtained in very small yield. Even after prolonged hydrogenolysis in methanol acetice acid and with 10% palladium or charcoal a large amount of unreacted 8-amino-2,3,6,7-tetrahydro-2,2-dimethyl - 5,7 - dioxo-5H-thiazolo[3,2-c]pyrimidine - 3-carboxylic acid p-methylbenzyl ester was recovered.

What is claimed is:

1. A compound of the formula:

in which

R$^1$ is a member selected from the group consisting of —H, alkanoyl of 1 to 6 carbon atoms, phenylacetyl, phenoxyacetyl, 4-phenoxybutanoyl and benzoyl; and R$^2$ is a member selected from the group consisting of —H, p-nitrobenzyl and p-methylbenzyl.

2. The compounds of claim 1 in which R$^1$ is —H, phenylacetyl or phenoxyacetyl.

3. The compound of claim 1 which is 2,3,6,7-tetrahydro-2,2-dimethyl - 5,7 - dioxo - 8 - (2-phenoxyacetamido)-5H - thiazolo[3,2-c]pyrimidine - 3 - carboxylic acid, p-nitrobenzyl ester.

4. The compound of claim 1 which is 2,3,6,7-tetrahydro-2,2-dimethyl - 5,7 - dioxo - 8 - (2-phenoxyacetamido)-5H-thiazolo[3,2-c]pyrimidine-3-carboxylic acid.

5. The compound of claim 1 which is 8-amino-2,3,6,7-tetrahydro - 2,2 - dimethyl - 5,7 - dioxo-5H-thiazolo[3,2-c]pyrimidine-3-carboxylic acid p-nitrobenzyl ester.

6. The compound of claim 1 which is 2,3,6,7-tetrahydro-2,2-dimethyl - 5,7 - dioxo - 8 - (2-phenylacetamido)-

5H-thiazolo[3,2-c]pyrimidine-3-carboxylic acid, p - nitrobenzyl ester.

7. The compound of claim 1 which is 2,3,6,7-tetrahydro-2,2-dimethyl - 5,7 - dioxo - 8 - (2-phenylacetamido)-5H-thiazolo[3,2-c]pyrimidine-3-carboxylic acid.

8. The compound of claim 1 which is 2,3,6,7-tetrahydro-2,2-dimethyl - 5,7 - dioxo - 8 - (2-phenoxyacetamido)-5H-thiazolo[3,2-c]pyrimidine-3-carboxylic acid, p-methylbenzyl ester.

9. The compound of claim 1 which is 8-amino-2,3,6,7-tetrahydro - 2,2 - dimethyl - 5,7-dioxo-5H - thiazolo-[3,2-c]pyrmidine-3-carboxylic acid, p-methylbenzyl ester.

10. The compound of claim 1 which is 8-amino-2,3,6,7-tetrahydro - 2,2 - dimethyl - 5,7 - dioxo - 5H - thiazolo [3,2-c]pyrimidine-3-carboxylic acid.

11. A process for the production of a compound of the formula:

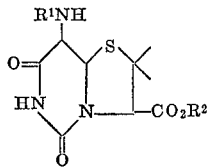

in which
R$^1$ is a member selected from the group consisting of —H, alkanoyl of 1 to 6 carbon atoms, phenylacetyl, phenoxyacetyl, 4-phenoxybutanoyl and benzoyl; and R$^2$ is a member selected from the group consisting of —H, p-nitrobenzyl and p-methylbenzyl, which comprises reacting a 6-amido-1-oxopenicillanic acid ester with a (lower)alkyl carbonic isocyanic anhydride in an inert aprotic, organic solvent at from ambient temperature to about 100° C.

12. The process of claim 11 in which said aprotic solvent is tetrahydrofuran, dioxane or dimethoxyethane.

13. The process of claim 11 in which said (lower)alkyl carbonic isocyanic anhydride is ethyl carbonic isocyanic anhydride.

14. The process of claim 11 in which the reaction temperature is from about 60 to 100° C.

References Cited

UNITED STATES PATENTS

| | | | |
|---|---|---|---|
| 2,933,497 | 4/1960 | Dodson | 260—256.5 R |
| 3,225,058 | 12/1965 | Juby | 260—256.5 R |
| 3,704,304 | 11/1972 | Wei et al. | 260—256.5 R |
| 3,740,394 | 6/1973 | Baetz | 260—256.5 R |

OTHER REFERENCES

Masters et al.: J. Am. Chem. Soc., 64, 2709-12 (1942).

RICHARD J. GALLAGHER, Primary Examiner

U.S. Cl. X.R.

260—239.1; 424—251